United States Patent [19]

Ansbaugh et al.

[11] 4,114,353
[45] Sep. 19, 1978

[54] TERRAIN TRAVERSING DEVICE HAVING IMPELLER MEANS FOR PROPELLING GRASS CLIPPINGS AND LEAVES INTO A RECEPTACLE

[75] Inventors: Donald I. Ansbaugh, Granger; Glenn A. Heilman, Mishawaka, both of Ind.

[73] Assignee: Heilman Enterprises, Inc., Mishawaka, Ind.

[21] Appl. No.: 552,537

[22] Filed: Feb. 24, 1975

[51] Int. Cl.² .............................................. A01D 35/22
[52] U.S. Cl. ........................................ 56/13.3; 56/202
[58] Field of Search ................... 56/13.3, 13.4, 16.9, 56/202, 203, 204

[56] References Cited

U.S. PATENT DOCUMENTS

| 2,815,634 | 12/1957 | Bush | 56/13.4 |
| 2,920,435 | 1/1960 | Vallone | 56/13.3 |
| 3,037,339 | 6/1962 | Nicholson | 56/202 |
| 3,065,588 | 11/1962 | Shaw | 56/13.4 |
| 3,316,696 | 5/1967 | Florido | 56/16.9 |
| 3,657,865 | 4/1972 | Ober | 56/13.3 |

*Primary Examiner*—Russell R. Kinsey
*Attorney, Agent, or Firm*—Oltsch & Knoblock

[57] ABSTRACT

A lawn device, such as a mower, which includes a cutter assembly for cutting grass or similar matter and which also includes a power driven impeller located next to the cutter assembly. The impeller receives the clippings produced by the cutter assembly and propels such clippings through a conduit into a suitable collection bag carried by the device.

7 Claims, 7 Drawing Figures

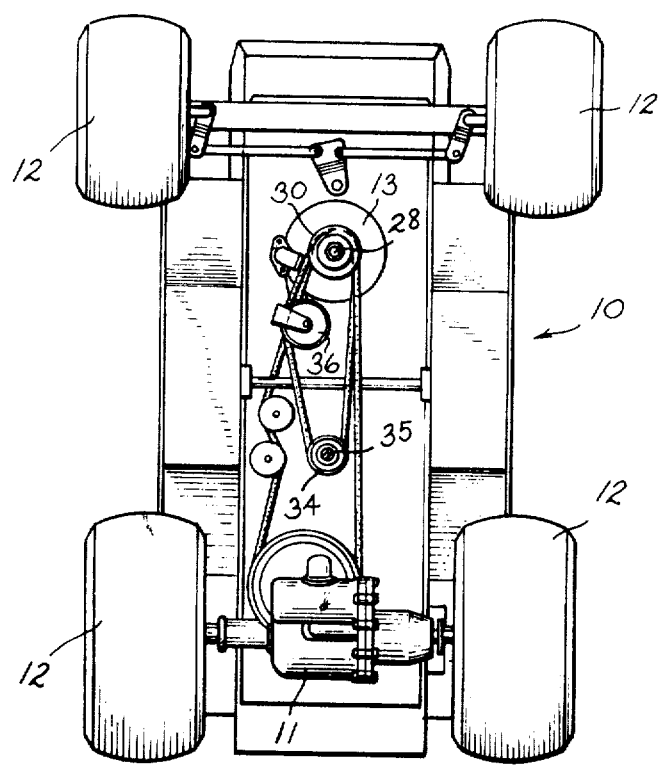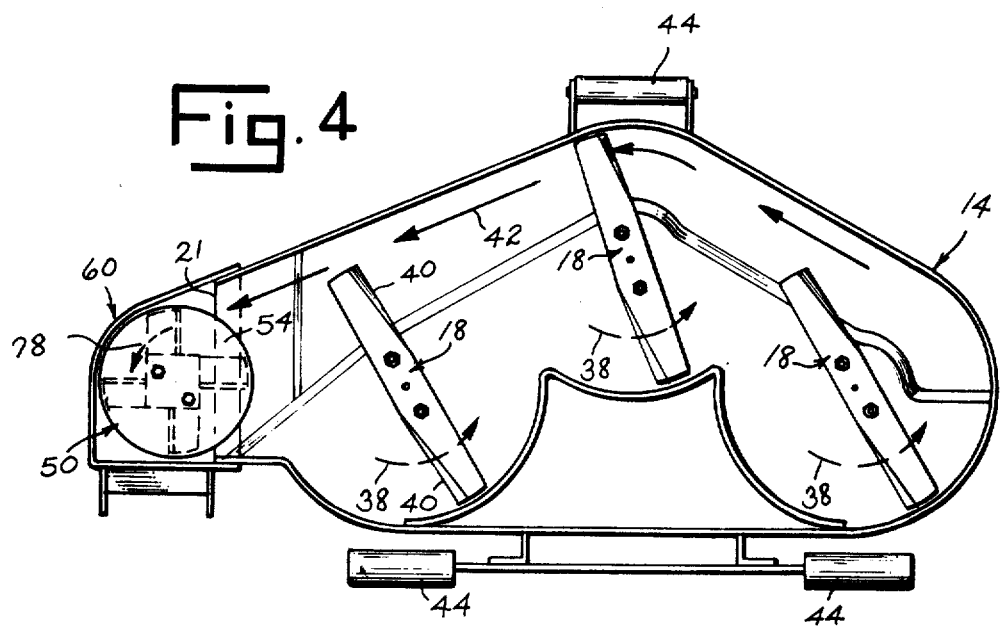

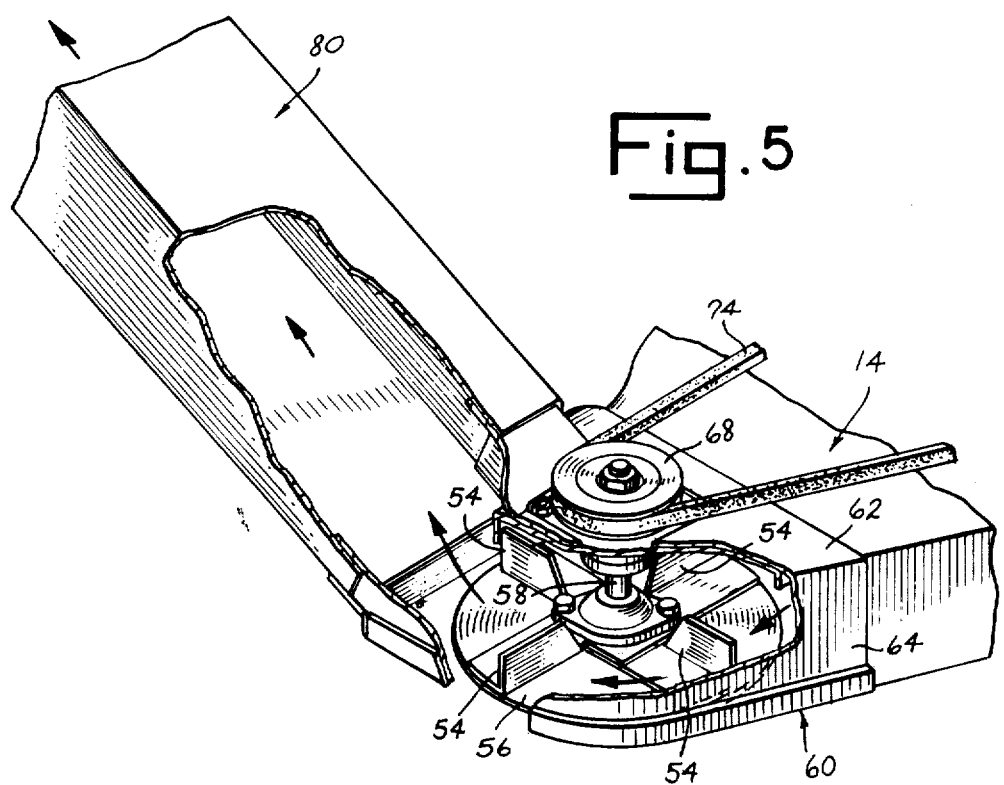
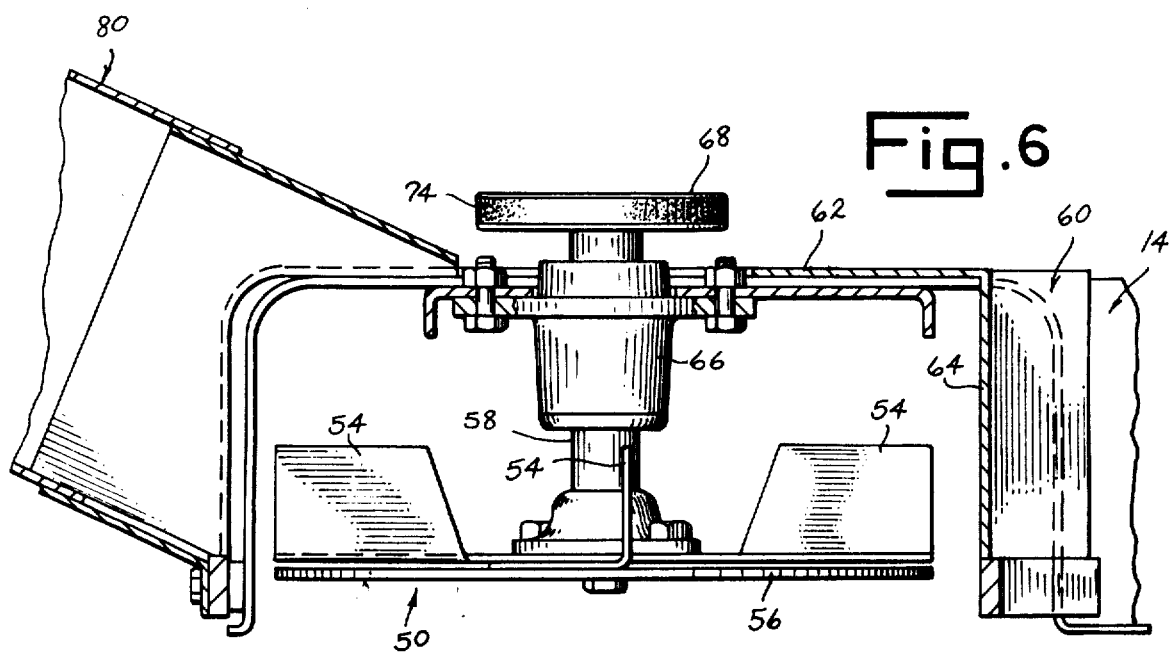

TERRAIN TRAVERSING DEVICE HAVING IMPELLER MEANS FOR PROPELLING GRASS CLIPPINGS AND LEAVES INTO A RECEPTACLE

BACKGROUND OF THE INVENTION

This invention concerns a terrain traversing device for cutting grass or collecting leaves having means for conveying the grass clippings or leaves into a bag or similar receptacle carried by the device.

It has been the practice for many years to provide lawn mowers, especially of the riding type and of a rotary blade construction, with a basket or bag for the purpose of collecting the clippings produced by the mower. In recent years fans and blowers have been utilized to provide a suction or wind driven assist to direct the clippings from the cutter blade housing of the mower into the collection bag. Such fans and blowers are generally positioned either within the collection bag or in the passageway or conduit leading from the cutter housing to the collection bag and produce a bulkiness to the clipping pickup assembly of the mower.

In this invention, a description of which follows, a compact impeller is located next to the cutting assembly near the ground and serves to propel the clippings of the mower through a connecting conduit and into a collection bag.

SUMMARY OF THE INVENTION

This invention relates to a device for cutting grass and picking up leaves from the ground and will have specific application to an improved means for depositing the cut matter or leaves into a bag or similar collection receptacle as the device traverses the ground. Such device includes a rotating means which is utilized to cut the grass or to pick up the leaves and which has an impeller means positioned adjacent it to receive the clippings or leaves. A conduit extends from the impeller means to a collection receptacle carried by the device. The impeller is preferably driven simultaneously with the rotating means and serves to mulch the clippings and leaves and to propel the mulched clippings and leaves through the connecting conduit into the collection receptacle. The impeller is of a compact construction and is preferably supported by the housing for the rotating means of the device.

It is an object of this invention to provide a device which cuts grass or picks up leaves as it traverses the ground and which has an improved clipping and leaf pickup means.

Another object of this invention is to provide a riding type lawnmower having an impeller mounted adjacent the cutting blades of the mower for the purpose of mulching and directing the mower clippings into a receptacle carried by the mower.

Still another object of this invention is to provide a mower which is for cutting grass and similar matter and which includes an economical and efficient means for causing the clippings of the mower to be deposited in a collection receptacle.

Other objects of this invention will become apparent upon a reading of the invention's description.

BRIEF DESCRIPTION OF THE DRAWINGS

FIG. 3 is a view of the mower of FIG. 1 as viewed from below.

FIG. 4 is a view of the cutter blade attachment and clipping impeller as viewed from below.

FIG. 5 is a perspective view of the clipping impeller with a part of the housing for the impeller shown broken away for purposes of illustration.

FIG. 6 is a sectional view of the clipping impeller taken along line 6—6 of FIG. 2.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
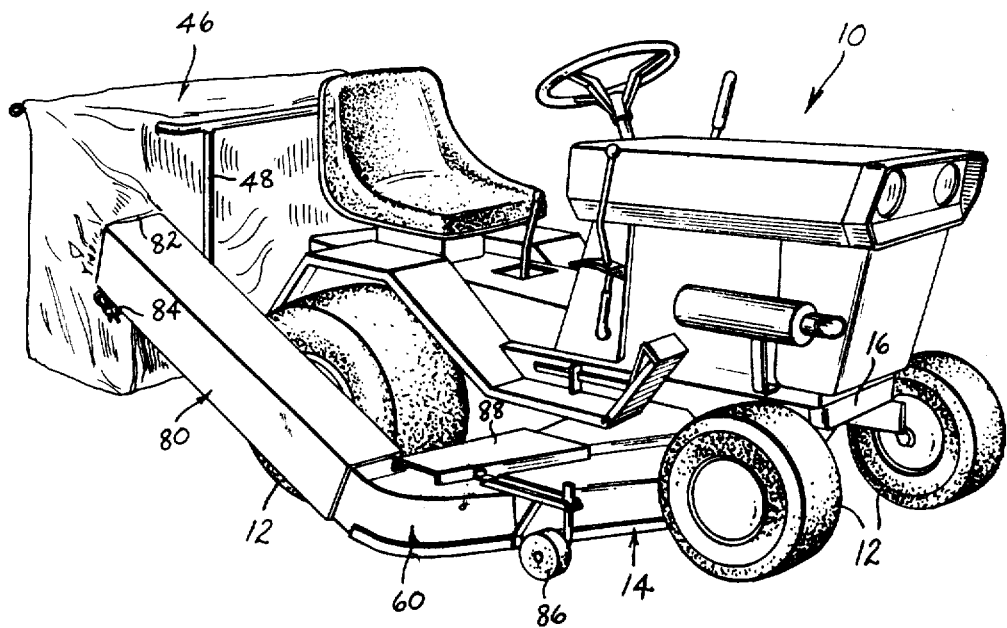
FIG. 1 is a perspective view of a riding lawnmower having the clipping collection improvement of this invention incorporated therein.
Figure 2:
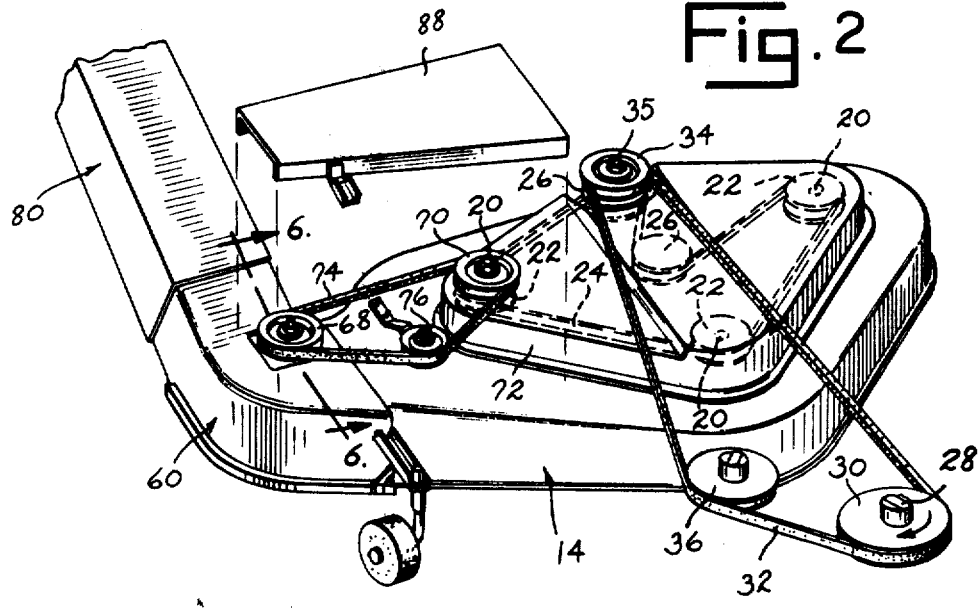
FIG. 2 is a fragmentary isolated view of the cutter blade attachment of the mower of FIG. 1 with parts shown in exploded form for the purpose of illustration.
Figure 7:
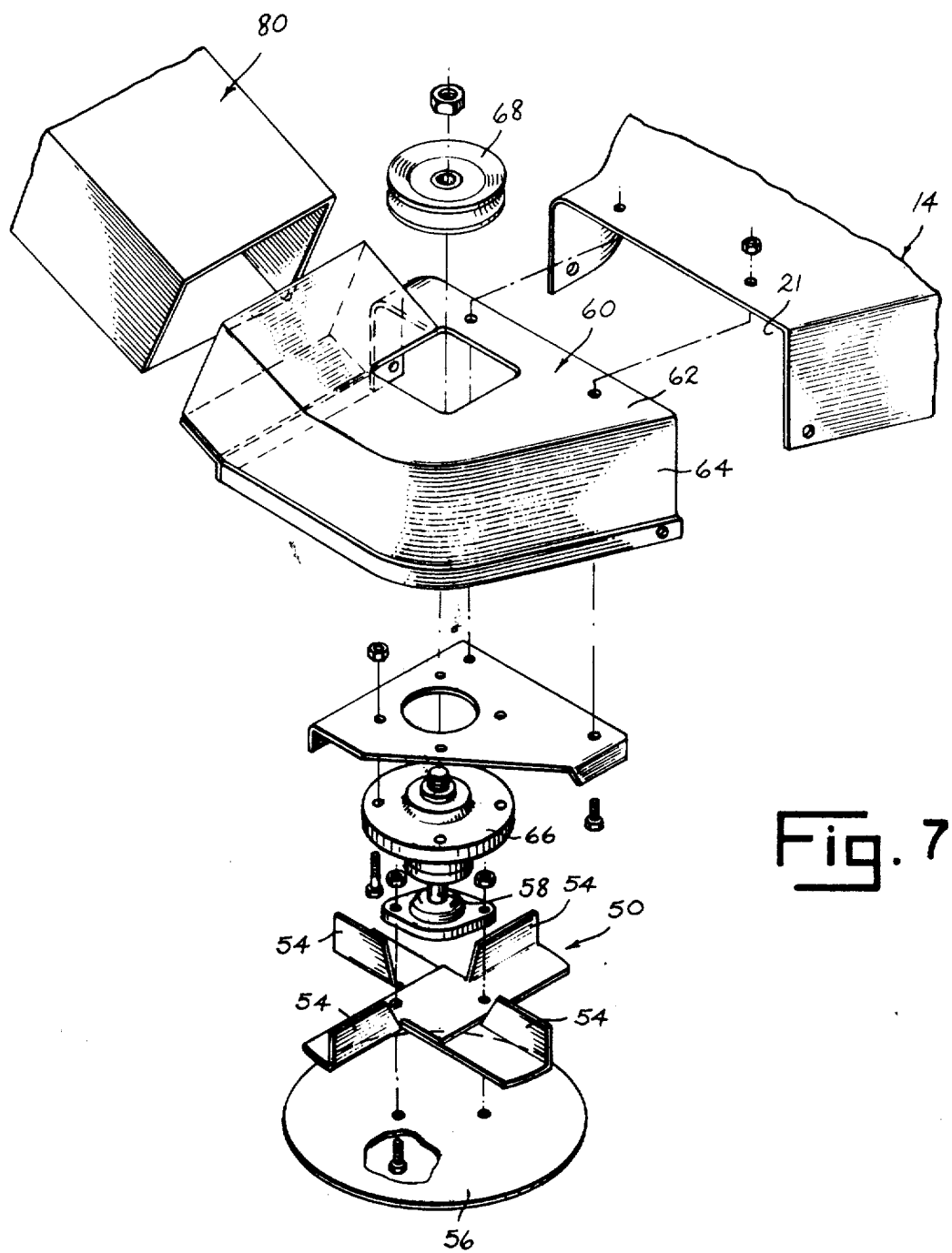
FIG. 7 is a view of the component parts of the clipping impeller shown in disassembled form.

The lawn vehicle 10 illustrated in FIG. 1 is of the riding type utilized to cut grass or similar growing matter. Vehicle 10 includes wheels 12 which are powered through a suitable transmission device 11 by means of either a gasoline engine 13 or battery powered electric motor (not shown). A mower assembly housing 14 is connected to frame 16 of vehicle 10. Located within housing 14 is a plurality of cutter blades 18. Each cutter blade 18 is connected for rotation to a vertically oriented shaft 20 which extends upwardly through housing 14 and is journaled therein by a suitable bearing member. A pulley 22 is connected to each cutter blade shaft 20 where it protrudes from housing 14. The number of cutter blades 18 in a mower assembly may vary from a single blade to three, four or more blades. A drive belt 24 extends around pulleys 22 and two idler pulleys 26. The gasoline engine 13 utilized to propel vehicle 10 includes a driveshaft 28 to which a pulley 30 is connected. A drive belt 32 extends around pulley 30 and another pulley 34 which is connected to a common shaft 35 carrying one of the idler pulleys 26. A pulley 36 also engages drive belt 32 and is utilized to vary the tension in the belt. Upon rotation of driveshaft 28, cutter blades 18 are rotated in the direction indicated by broken line arrows 38 in FIG. 4.

Each cutter blade 18 is designed with a pair of oppositely located lift edges 40 which serve to lift the grass clippings or leaves and direct the clippings or leaves along the interior of mower assembly housing 14 to its discharge opening 21, as illustrated by the solid line arrows 42 in FIG. 4. Mower assembly housing 14 also preferably carries a plurality of casters or rollers 44 which in conjunction with the pivotal connection of the housing to vehicle frame 16 causes the cutter blades to parallel and be spaced a selected distance from ground level as vehicle 10 traverses the ground. As thus far described, vehicle 10 is of a common, well known construction. The shape of the mower assembly housing, the number of cutter blades, and the manner of driving the cutter blades as well as propelling the lawn vehicle can vary, depending upon the type and size of the vehicle and its manufacturer.

A collection bag 46 for the grass clippings, leaves and other matter picked up by cutter blades 18 of the vehicle 10 is carried upon a suitable rigid frame support 48 connected to frame 16 of the vehicle. While bag 46 is shown in the illustrated embodiment as being located at the rear of vehicle 10, it is to be understood that the precise location of the bag may vary from vehicle construction to construction.

An impeller 50 receives the grass clippings, leaves and other matter thrown out of discharge opening 21 of mower assembly housing 14 by cutter blades 18 and propels such matter into collection bag 46. Impeller 50 is located in approximately the same plane as cutter blades 18 and includes a plurality of equal-angularly spaced blade parts 54 radially positioned upon a circular bottom wall 56. A driveshaft 58 is connected to blade parts 54 and projects upwardly from wall 56. A sectored housing 60 having a top wall 62 and an arcuate side wall 64 covers impeller 50. Shaft 58 of the impeller projects upwardly through top wall 62 of housing 60 and is connected to the housing by means of a bearing mount 66. Impeller housing 60 is connected to mower assembly housing 14 at its discharge opening 21 with impeller 50 being located closely adjacent cutter blades 18 and in the direct path of movement of the clippings and similar matter being thrown from housing 14 during blade operation.

A pulley 68 is connected to impeller driveshaft 58 where it projects upwardly through top wall 62 of impeller housing 60. A pulley 70 is connected to the shaft 20 carrying the nearest cutter blade 18. Pulley 70 is located exteriorly of a cover 72 which encloses drive belt 24 for the cutter blades. An endless drive belt 74 extends around pulleys 68 and 70. A pulley 76 also engages drive belt 74 and is supported by impeller housing 60 for the purpose of tensioning the drive belt. Upon the rotation of cutter blades 18, drive belt 74 will cause impeller 50 to rotate in the direction illustrated by broken line arrow 78 in FIG. 4.

A conduit 80 has its lower end connected to impeller housing 60 and its upper end extending into an opening 82 in collection bag 46. Conduit 80 in conjunction with impeller housing 60 forms a passageway from impeller 50 to the interior of collection bag 46. As best illustrated in FIGS. 4, 5 and 6, the diametric dimension of impeller 50 is such that bottom wall 56 of the impeller nearly fills the housing to provide a substantially continuous lower wall from discharge opening 21 of mower assembly housing 14 to conduit 80. Particulate matter, such as clippings and leaves ejected under the influence of cutter blades 18 from the discharge opening of housing 14 will be picked up by impeller 50, mulched, and propelled from the impeller housing upwardly through conduit 80 and into collection bag 46 which is vented. The upper end of conduit 80 may rest upon a transverse bar support 84 which forms a part of support 48 for the collection bag. Additionally, a caster or similar type roller 86 is carried by impeller housing 60 for the purpose of contacting the terrain and providing a balancing support for mower assembly housing 14. For purposes of safety, pulleys 68, 70 and 76 and drive belt 74 associated with impeller 50 may be enclosed within a cover 88 mounted to the top of mower assembly housing 14.

It is to be understood that impeller 50 can be mounted for rotation about a horizontal axis instead of the vertical axis of rotation illustrated in the figures so long as the impeller is positioned closely adjacent the mower's cutter blade. Also, it is to be understood the impeller 50 could be adapted to accommodate a mower assembly housing having a rear discharge opening instead of the commonly used side discharge opening illustrated in the figures.

It is to be further understood that the invention is not to be limited to the details above described but may be modified within the scope of the following claims.

What we claim is:

1. In a device which includes a frame supported by wheels for movement over the terrain, a cutter blade housing carried by said frame and including a discharge opening, rotating cutter means within said housing and positioned adjacent said terrain for cutting grass or picking up leaves and causing the clippings of said grass or said leaves to be collected within said housing and ejected therefrom through said housing discharge opening, means for rotating said cutter means, the improvement wherein said device includes receptacle means for collecting said clippings or leaves as they are ejected from said cutter housing, conduit means extending between said housing discharge opening and receptacle means defining in conjunction with said housing a path from said cutter means into the interior of said receptacle means, impeller means located within said path and adjacent said cutter means for contacting and propelling said discharged clippings or leaves along the remainder of said path into the interior of said receptacle means, means for rotating said impeller means, said housing including a top and side wall joining said conduit means, said housing supporting said impeller means at the discharge opening therein and adjacent said housing side wall, vertically oriented shaft means supporting each cutter means and said impeller means for rotation in a plane generally paralleling said terrain, said impeller means including a disk-shaped wall part carried by said shaft means, said wall part lying in substantially the same plane as the plane of rotation of said cutter means, said impeller means wall part positioned adjacent said housing side wall and conduit means and defining a substantially continuous lower wall means from said housing discharge opening to said conduit means for conducting said discharged clippings or leaves into said conduit means, said impeller means wall part including an upper surface, a plurality of blade parts carried upon said upper surface and extending generally radially outwardly from said wall part supporting shaft means to contact and propel said discharged clippings or leaves through said conduit means and into said receptacle means.

2. The device of claim 1 wherein said housing side wall is arcuate, said impeller means wall part having a peripheral edge, said housing side wall extending complementally about a part of said peripheral edge.

3. The device of claim 1 wherein said rotating means for the impeller means includes a pulley, said rotating means for the cutter means including a pulley, a power source means carried by said frame and including drive pulley, and endless drive belt extending around each of said pulleys whereby said cutter means and impeller means are rotated upon activation of said power source means and rotation of its drive pulley.

4. The device of claim 3 and including power transmitting means connecting said power source means to said wheels for rotation of said wheels and movement of said device over said terrain.

5. The device of claim 1 wherein said cutter means constitutes at least two blade members each supported for rotation about a vertical axis, power source means carried by said frame and including a rotatable drive member, power transmitting means extending between said rotatable drive member and said impeller and each blade member whereby activation of said power source means causes the simultaneous rotation of said blade members and impeller.

6. The device of claim 5 wherein said rotatable drive member is a pulley, a pulley associated with each of said blade members and impeller, said power transmitting means including an endless drive belt extending around said pulleys.

7. The device of claim 1 wherein said conduit means inclines upwardly between said housing discharge opening and receptacle means.

* * * * *